United States Patent
Zhang et al.

(10) Patent No.: US 11,663,762 B2
(45) Date of Patent: May 30, 2023

(54) PRESERVING REGIONS OF INTEREST IN AUTOMATIC IMAGE CROPPING

(71) Applicant: Adobe Inc., San Jose, CA (US)

(72) Inventors: Jianming Zhang, Campbell, CA (US); Zhe Lin, Fremont, CA (US); Radomir Mech, Mountain View, CA (US); Xiaohui Shen, San Jose, CA (US)

(73) Assignee: Adobe Inc., San Jose, CA (US)

( * ) Notice: Subject to any disclaimer, the term of this patent is extended or adjusted under 35 U.S.C. 154(b) by 132 days.

(21) Appl. No.: 17/083,899

(22) Filed: Oct. 29, 2020

(65) Prior Publication Data

US 2021/0110589 A1    Apr. 15, 2021

Related U.S. Application Data

(62) Division of application No. 15/620,636, filed on Jun. 12, 2017, now Pat. No. 10,867,422.

(51) Int. Cl.
    *G06T 11/60* (2006.01)
    *G06T 3/00* (2006.01)
    *G06T 7/12* (2017.01)

(52) U.S. Cl.
    CPC ............ *G06T 11/60* (2013.01); *G06T 3/0012* (2013.01); *G06T 7/12* (2017.01); *G06T 2207/20132* (2013.01); *G06T 2210/22* (2013.01)

(58) Field of Classification Search
    None
    See application file for complete search history.

(56) References Cited

U.S. PATENT DOCUMENTS

| | | | |
|---|---|---|---|
| 5,566,280 A | 10/1996 | Fukui et al. | |
| 9,626,584 B2 | 4/2017 | Lin et al. | |
| 9,697,612 B2 | 7/2017 | Wei et al. | |
| 2005/0276477 A1 | 12/2005 | Lin et al. | |
| 2013/0108175 A1* | 5/2013 | Ptucha | G06T 11/60 382/199 |
| 2013/0148880 A1 | 6/2013 | Kennedy et al. | |
| 2014/0267435 A1 | 9/2014 | Choe et al. | |

(Continued)

OTHER PUBLICATIONS

Chen, Jiansheng, Automatic Image Cropping: A Computational Complexity Study, Computer Vision Foundation. Proceedings of the IEEE Conference on Computer Vision and Pattern Recognition, 2016, pp. 507-515.

(Continued)

*Primary Examiner* — Kyle Zhai
(74) *Attorney, Agent, or Firm* — Shook, Hardy & Bacon L.L.P.

(57) ABSTRACT

Embodiments of the present invention are directed to facilitating region of interest preservation. In accordance with some embodiments of the present invention, a region of interest preservation score using adaptive margins is determined. The region of interest preservation score indicates an extent to which at least one region of interest is preserved in a candidate image crop associated with an image. A region of interest positioning score is determined that indicates an extent to which a position of the at least one region of interest is preserved in the candidate image crop associated with the image. The region of interest preservation score and/or the preserving score are used to select a set of one or more candidate image crops as image crop suggestions.

20 Claims, 13 Drawing Sheets

(56) References Cited

U.S. PATENT DOCUMENTS

| | | |
|---|---|---|
| 2015/0161466 A1 | 6/2015 | Welinder et al. |
| 2015/0206169 A1 | 7/2015 | Ye et al. |
| 2017/0083762 A1 | 3/2017 | Segalovitz et al. |
| 2017/0294038 A1 | 10/2017 | Moriya |
| 2018/0184062 A1 | 6/2018 | Hariri |
| 2018/0352191 A1 | 12/2018 | Eppolito et al. |
| 2020/0394434 A1 | 12/2020 | Rao et al. |

OTHER PUBLICATIONS

Notice of Allowance dated Jan. 6, 2021 in U.S. Appl. No. 16/548,232, 10 pages.

* cited by examiner

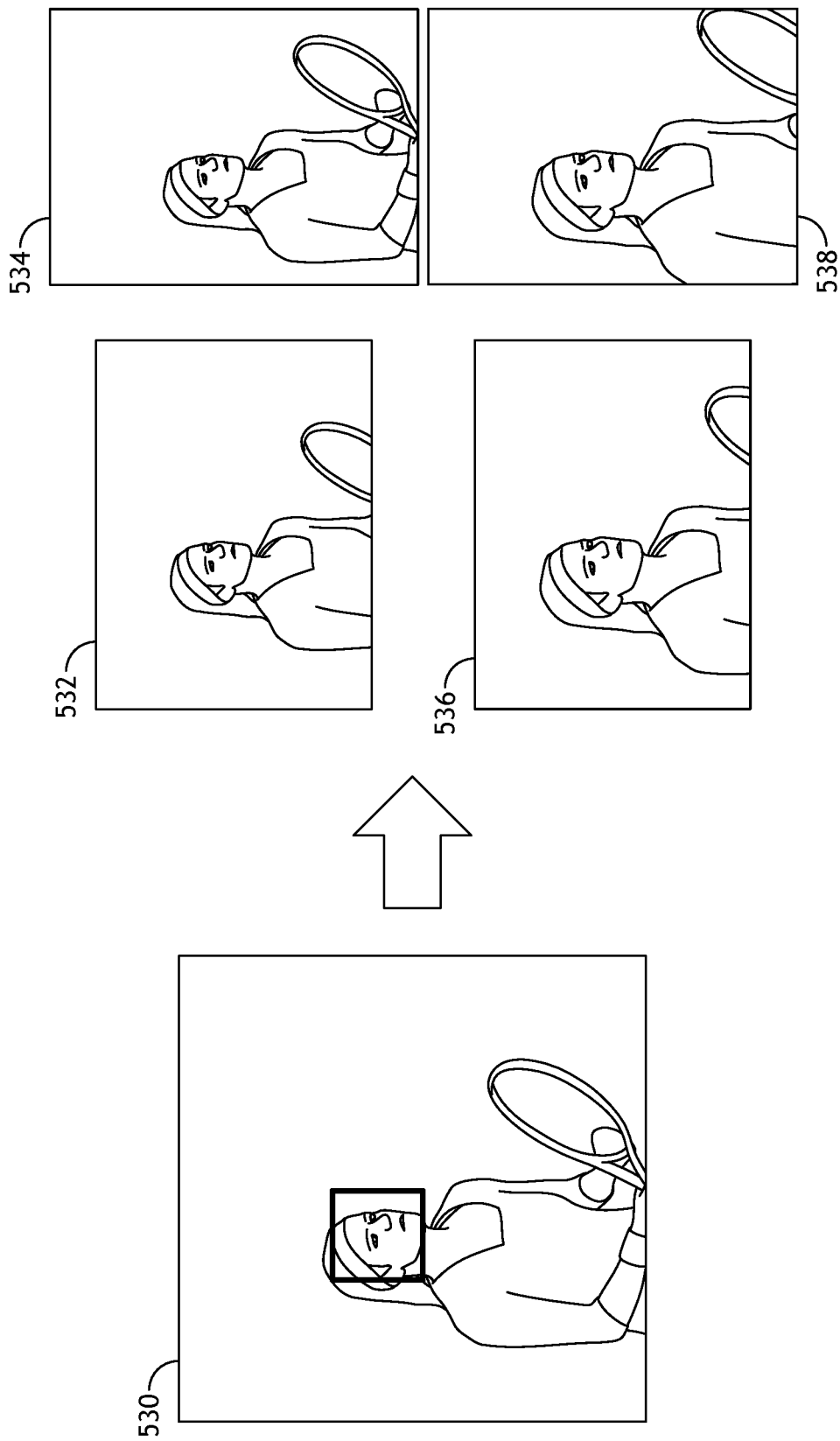

PRESERVING REGIONS OF INTEREST IN AUTOMATIC IMAGE CROPPING

CROSS-REFERENCE TO RELATED APPLICATIONS

This application is a divisional of U.S. patent application Ser. No. 15/620,636 filed Jun. 12, 2017 and titled "Facilitating Preservation of Regions of Interest In Automatic Image Cropping," the entire contents of which are incorporated by reference herein.

BACKGROUND

To generate a visually pleasing image, image cropping is a frequently performed task in photograph processing. Generally, image cropping is performed to select a sub-region of a given image that is considered well-composed. Cropping images manually as desired by a user can be time intensive, for example, in instances when multiple photos are cropped. Further, manual cropping may result in a cropped image that is visually unsatisfactory, particularly in cases that a user is less experienced in photography and digital editing.

With the advancement of image editing software, automated image cropping has been developed to enable efficient image cropping and facilitate improved photo composition. To generate well-composed image crops, some conventional techniques strive to preserve important regions in the cropped image. In particular, conventional techniques encourage preserving important aspects in an image by emphasizing (e.g., via higher scores used to rank image crops) image crops that include the entirety of the important regions and/or image crops that maximize the area of important regions included in the image crops.

Although such conventional techniques can generally preserve aspects deemed important in image crops, the resulting image crops can still be visually unsatisfactory. For example, although an image crop may include each face in an image, if the crop edges are too close to a facial region, the resulting image may be visually unpleasing. Further, such existing techniques do not take into account positioning of the important regions in the crops. For instance, if an image crop is constricted to an aspect deemed important in an image, the resulting cropped image may not capture the image context associated with the aspect deemed important, thereby resulting in an undesired image crop. By way of example only, an image crop constricted to a facial region may not include an object at which the user is looking, which may be critical for a well-composed image crop.

SUMMARY

Aspects of the present disclosure relate to facilitating preservation of regions of interest in automated image cropping. Generally, various scores (e.g., preservation score and positioning score) are determined that indicate extents to which regions of interest are preserved in candidate image crops. In accordance with some embodiments of the present invention, a region of interest preservation score using adaptive margins can be determined. The region of interest preservation score indicates an extent to which at least one region of interest is preserved in a candidate image crop associated with an image using adaptive margins. A region of interest positioning score can also be determined that indicates an extent to which a position of the at least one region of interest is preserved in the candidate image crop associated with the image. The region of interest preservation score and/or the preserving score may be used to select a set of one or more candidate image crops as image crop suggestions. A user can then view the image crop suggestions and selected a desired image cropping.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIGS. 5A-5C illustrate image crop suggestions selected in accordance with ROI positioning preservation, according to embodiments of the present disclosure;

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Overview

Automated image cropping is oftentimes performed to efficiently and effectively provide cropped images, or image cropping suggestions, to a user. For instance, automated image cropping performed by conventional image editing techniques can save a user time, particularly, when numerous images are to be cropped. Such existing automated image cropping techniques can also assist users with improving image composition. At a high level, automated image cropping techniques generally analyze various image croppings to identify cropped images most visually pleasing, that is, well-composed cropped images. The cropped images deemed most visually pleasing can then be provided to a user as image crop suggestions.

In identifying visually pleasing or well-composed cropped images, conventional automated image cropping techniques aim to avoid cropping a significant aspect from an image. As such, some conventional automated image cropping techniques desire to preserve content in the image that is determined to be important (e.g., faces). In this regard, image crops that preserve interesting content are more likely to be provided as image crop suggestions to a user than image crops that do not preserve interesting content. For instance, an image crop resulting in removal of all or a portion of an individual's face is generally an undesired image crop and, as such, unlikely to be selected to provide as an image crop suggestion. By comparison, an image crop resulting in inclusion of all of the individual's face is generally more visually pleasing and, as such, more likely to be selected to provide as an image crop suggestion.

To preserve interesting objects within image crops suggested to a user, such conventional techniques assess image crops based on the area and the number of interesting objects covered by the crop. In particular, when selecting image crops to suggest to the user, some conventional techniques encourage (e.g., via score calculations and/or weightings) image crops that preserve objects deemed interesting by maximizing the area and/or number of interesting objects existing within the proposed image crop.

Figure 1:
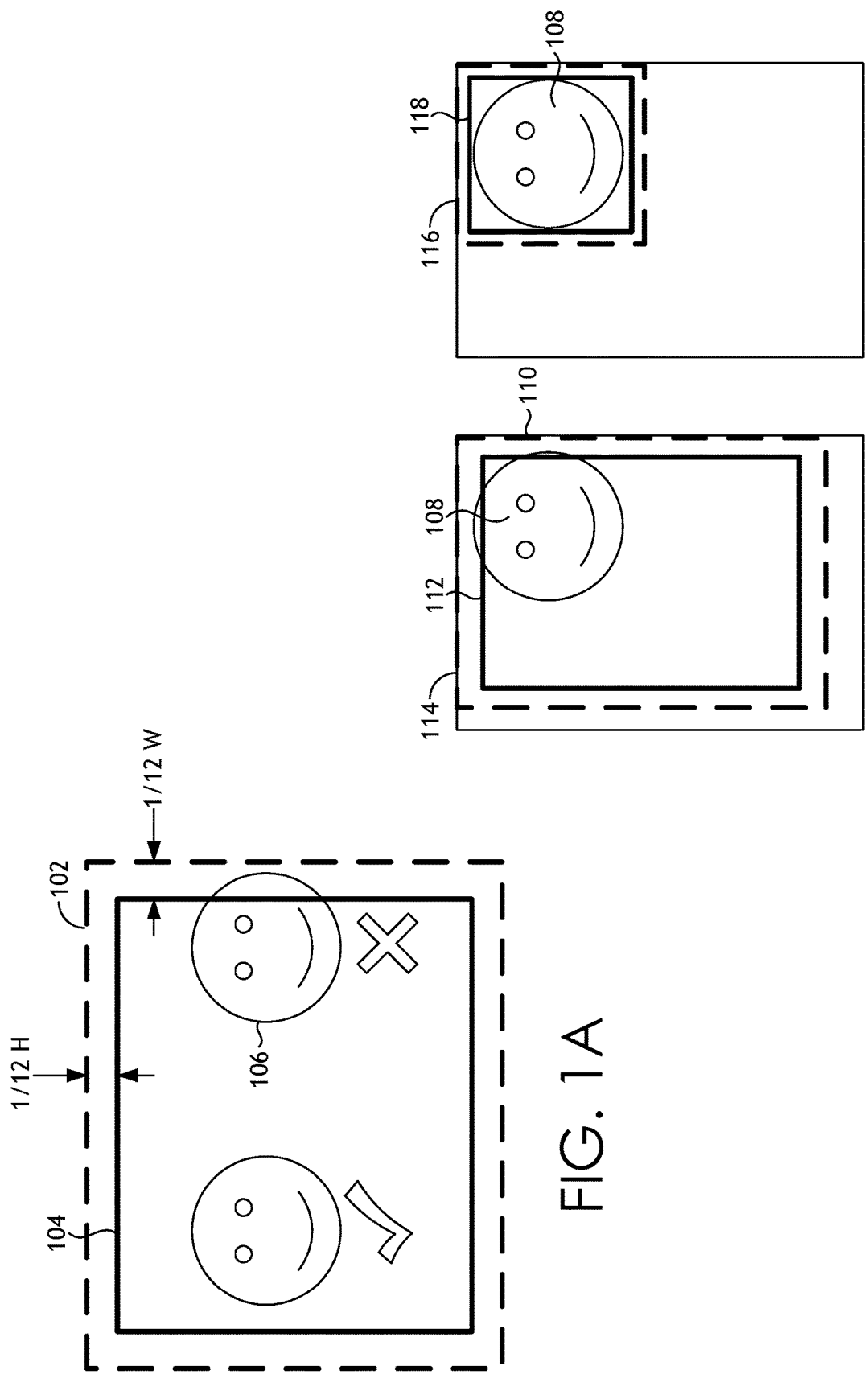
FIGS. 1A-1B shows image crops having fixed-scale margins.

To this end, one conventional technique used to preserve interesting objects includes determining whether the interesting objects fall within a valid region of an image crop. Typically, a valid region is defined based on margins within the image crop that are fixed in scale (e.g., 1/12 of the size of the cropped image). Using a fixed scale provides larger image crops with proportionally larger margins to maintain relative composition constraints. By way of example only, and with reference to FIGS. 1A and 1B, assume a cropped image 102 has a valid region 104 defined by a fixed-scaled margin (1/12 width or height) from the crop boundary. To identify preservation, existing technologies emphasize image crops that have the interesting objects falling within the valid region so that the objects do not get too near the image boundary leading to an imbalanced composition. As shown in FIG. 1A, the cropped image includes an object 106 that does not fall completely within the valid region 104 and, as such, this cropped image would result in a lower score, or considered less likely to preserve the interesting objects.

A fixed-scale margin, however, can lead to undesirable results when the objects of interest are near a boundary of the original image. For instance, an object near an image boundary may not be fully covered by the valid region of large candidate image crops. Rather, only small candidate image crops may contain the object within the valid region. As a result, in analyzing various image crops when an interesting object is near an image boundary, the image crops selected as suggestions to provide to a user are generally biased towards very tight crops as partial object coverings are generally considered to not preserve the interesting object(s). Using such tight, or small, crops, however, oftentimes exclude other important image content within the image.

By way of example only, as shown in FIG. 1B, assume an object 108 is near an image boundary 110. Further assume a large image crop 114 has a valid region 112 in accordance with a fixed-scale margin. In such a case, when the object 108 is near the image boundary 110, the valid region 112 of the large image crop 114 does not fully cover the object 108. Accordingly, using conventional techniques, the large image crop 114 would not be considered to preserve the object 108 and, therefore, is unlikely to be provided as an image crop suggestion. On the other hand, a small image crop 116 having a valid region 118 in accordance with a fixed-scale margin does fully cover the object 108 and, as such, is more likely to be provided as an image crop suggestion. As a result, image crop suggestions are generally biased towards very tight crops that may exclude other important image content.

Further, utilizing existing approaches in an effort to maintain interesting objects in an image crop, positions of objects are not taken into consideration, which can result in unsatisfactory image crops being presented as suggestions to a user. As described, the existing techniques detect whether interesting objects are included in image crops, but do not consider the position or placement of the interesting objects. For example, even though an image crop may incorporate each interesting object, if the crop is too tight around the object (e.g., face), important context within the image may be excluded. Further, positioning of the interesting objects can be critical for a well-composed image crop.

Accordingly, embodiments of the present invention are directed to facilitating preservation of regions of interest in automated image cropping. In this regard, images can be effectively or optimally cropped while preserving regions of interest (ROI), that is, regions within an image deemed important or interesting (e.g., via a user or an automated recognition). In particular, and as described herein, region of interest preservation is enhanced using ROI positioning preservation and/or ROI preservation via adaptive margins. In operation, the ROI positioning preservation and/or ROI preservation via adaptive margins techniques can be used to analyze various image crop candidates. The ROI positioning preservation analysis and/or ROI preservation via adaptive margins analysis can then be used to select a set of image crop candidates (e.g., via scoring, weighting, and/or ranking) to present to a user as image crop suggestions. Preserving ROIs via adaptive margins and ROI positioning can preserve the original composition captured in the original image and thereby result in more desirable, or visually pleasing, candidate image crops.

ROI positioning preservation generally facilitates preservation of original region of interest positioning in image cropping. In particular, a candidate image crop(s) that preserves or maintains the original position of the region(s) of interest within the image (original image composition) are identified and/or selected. In this regard, ROI positioning preservation generally preserves the initial composition a photographer has included when capturing the image. For example, a face region may be captured on the left side of the image because the individual is looking towards an object on the right side of the image. As such, ROI positioning preservation facilitates preservation of a similar relative position of the face region in an image crop as captured in the original image. That is, ROI positioning preservation seeks to preserve the face region being located on the left side of the image crop to increase the likelihood of capturing the context originally intended by the image capture, in this case, the object positioned on the right side of the image. By preserving the position of the face in an image crop, the image crop is more likely to include the object at which the individual is looking, as opposed to the object being excluded from the cropped image.

ROI preservation via adaptive margins analysis generally facilitates identification and/or selection of candidate image crops that completely or entirely include or encompass a region of interest(s) based on adaptive margins. In particular, ROI preservation utilizes margins that adapt based on position of the region(s) of interest in the image to analyze ROI preservation. The adaptive margin approach can adjust the margins in association with a candidate image crop, and thereby adjust the valid regions, using a fixed-scale margin or a distance between the aggregate region and the original image boundary, whichever is more appropriate. This adaptive margin approach typically adjusts the valid region of larger candidate image crops so that ROIs near the image boundary can be considered covered when assessing ROI preservation. In this regard, when the region(s) of interest is near an image boundary, the margins can be adjusted to facilitate identification and/or selection of candidate image crops that preserve ROIs, including larger candidate image crops. Advantageously, using an adaptive margin approach can enable larger candidate image crops, which may include important image content, to preserve regions of interest even when positioned near a boundary of the original image and, as such, promote such candidate image crops for selection as an image crop suggestion.

Although aspects of the present invention are generally described herein in relation to using ROI positioning preservation and/or ROI preservation via adaptive margins to select a set of candidate image crops to provide as image crop suggestions, as can be appreciate, this technology can be implemented in other manners. For example, ROI positioning preservation and/or ROI preservation via adaptive margins can be used to automatically apply an image crop to an image. The concepts included herein and others, including variations and combinations thereof, are contemplated as being within the scope of the present disclosure.

Example Automated Image Cropping Environment

Figure 2:
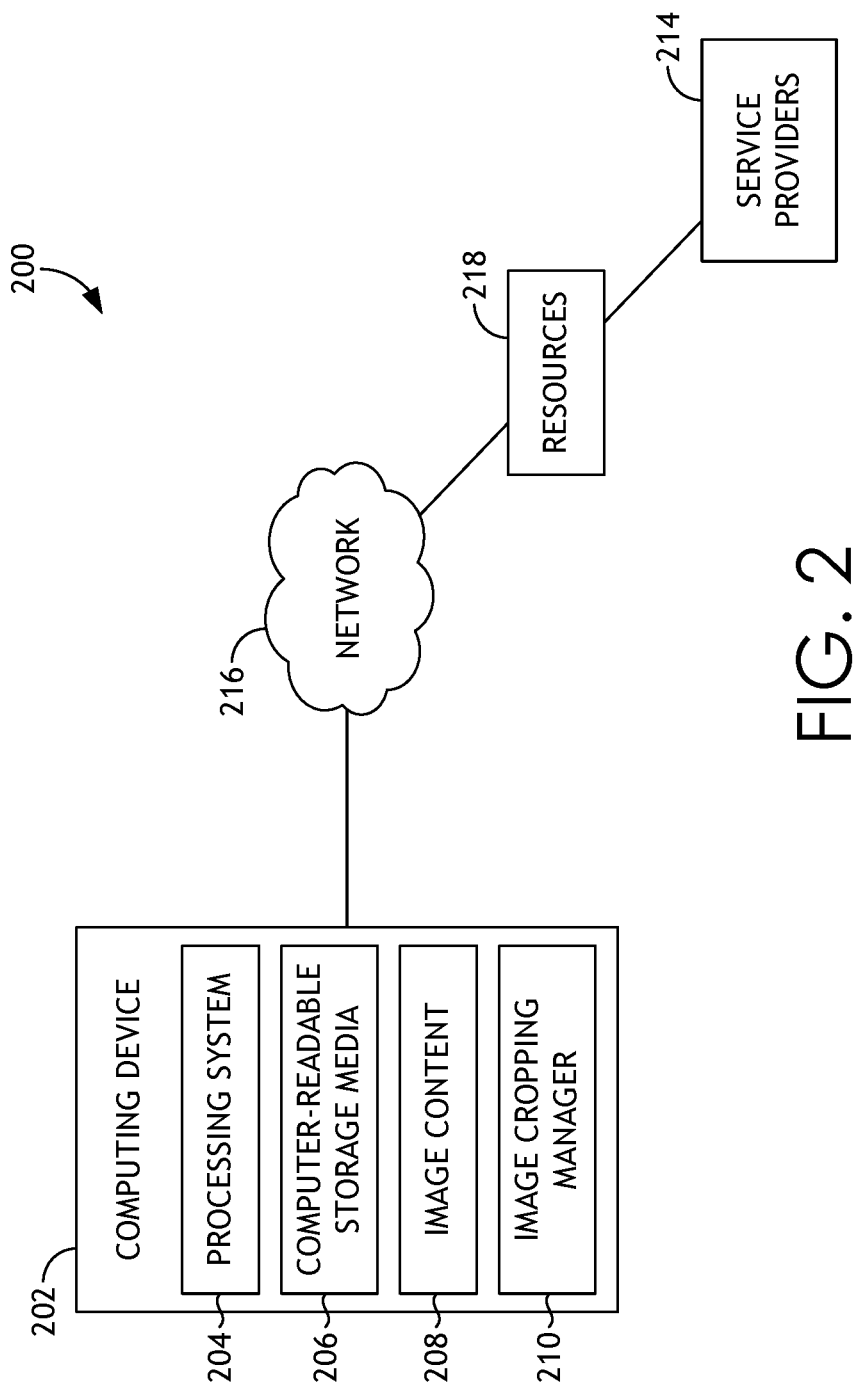
FIG. 2 is a block diagram showing an example of an operating environment, in accordance with embodiments of the present invention.

Turning now to FIG. 2, a block diagram is provided showing an example of an operating environment in which some implementations of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, operating environment 200 illustrates an example implementation that is operable to employ techniques described herein. The illustrated environment 200 includes a computing device 202 having a processing system 204 that may include one or more processing devices (e.g., processors) and one or more computer-readable storage media 206. The illustrated environment 200 also includes image content 208 and an image cropping manager 210. Embodied on the computer-readable storage media 206 and operable via the processing system 204 to implement corresponding functionality described herein. In at least some implementations, the computing device 202 may include functionality to access various kinds of web-based resources (content and services), interact with online providers, and so forth as described in further detail below.

The computing device 202 may be configured as any suitable type of computing device. For example, the computing device 202 may be configured as a server, a desktop computer, a laptop computer, a mobile device (e.g., a handheld configuration), a tablet, a camera (point-and-shoot, single lens reflex (SLR), a video recorder, etc.), a device configured to receive speech input, a device configured to receive stylus-based input, a device configured to receive a combination of those inputs, and so forth. Thus, the computing device 202 may range from full resource devices with substantial memory and processor resources (e.g., servers, personal computers, game consoles) to a low-resource device with limited memory and/or processing resources (e.g., mobile devices). Additionally, although a single computing device 202 is shown, the computing device 202 may be representative of a plurality of different devices to perform operations "over the cloud."

The environment 200 further depicts one or more service providers 214, configured to communicate with computing device 202 over a network 216, such as the Internet, to provide a "cloud-based" computing environment. Generally, service providers 214 are configured to make various resources 218 available over the network 216 to clients. In some scenarios, users may sign up for accounts that are employed to access corresponding resources from a provider. The provider may authenticate credentials of a user (e.g., username and password) before granting access to an account and corresponding resources 218. Other resources 218 may be made freely available (e.g., without authentication or account-based accessed). The resources 218 can include any suitable combination of services and/or content typically made available over a network by one or more providers. Some examples of services include, but are not limited to, photo printing services (e.g., Snapfish®, Shutterfly®, and the like), photo storage and/or sharing services (e.g., Flickr®), social network services (e.g., Facebook®, Twitter®, Instagram®, and the like), etc.

These sources may serve as significant amounts of image content. Such image content may be formatted in any of a variety of image formats, including but not limited to JPEG, TIFF, RAW, GIF, BMP, PNG, etc. The image content made available through the services may be posted by users that have accounts with those services. For example, a user having an account with a photo storage and/or sharing service may upload images, such as those taken with a digital camera of the user, or those sent to the user via electronic means. A user of the photo storage and/or sharing service may then share their uploaded images with others, such as by providing a link to photo albums or to a profile of the user.

The image cropping manager 210 is generally configured to represent functionality to implement automated image cropping that enhances regions of interest preservation in cropped images associated with image content 208. In particular, the image cropping manager 210 can facilitate preservation of ROI positioning and/or utilization of adaptive crop margins to preserve ROIs. Preserving ROIs and positioning thereof can result in more desirable, or visually pleasing, candidate image crops.

Using ROI positioning and ROI preservation via adaptive margins, the image cropping manager 212 may be configured in various ways to suggest image crops of the image content 208 that are more visually pleasing than the original image. To do so, the image cropping manager 212 may score multiple candidate image crops of an image according to visual characteristics of the candidate image crops, including ROI position and/or ROI preservation via adaptive margins. Accordingly, various component scores may be captured for candidate image crops to determine an overall score, or ranking, for the candidate image crops. As described herein, such component scores may include a preservation score, a positioning score, and any other score that can be used to select or rank candidate image crops. By way of example only, an aesthetic score may be generated and used in addition to the preservation score and positioning score to select or rank candidate image crops. Including such preservation and positioning scores can preserve the original composition captured in the original image and thereby generate higher quality image crops.

Upon scoring the candidate image crops, the image cropping manager 212 may select a set of candidate image crops to present to a user. For example, the candidate image crops may be ranked according to the scores, and a highest set of ranked candidate image crops can be selected for presentation as image crop suggestions. Other candidate image crops may also be selected, such as another candidate image crop that is highly ranked but that, according to the scores over the parameters, is visually different from the highest ranked candidate image crop(s). In this regard, to ensure a variety of visually different image crop suggestions, the image cropping manager 212 may cluster candidate image crops that are determined to be similar and select candidate image crops for suggestion from the different clusters, rather than selecting image candidate crops from a same cluster. As such, the selected candidate image crops may be used to suggest a variety of visually different, but visually pleasing, or well-composed, croppings of an image.

Image crop suggestions may be presented to a user through a user interface for selection. In a photo-editing application, for instance, the image content 208 (e.g., a digital image) may be accessed from storage and image crops of the image content 208 suggested through the user interface, e.g., by displaying windows over the image that each correspond to a suggested cropping. Through the user interface, the user may select one of the suggested image crops (e.g., one of the windows). As a result of the selection, the corresponding cropping may be applied to the image such that regions of the image outside the selected window are removed or hidden, and those within the window remain.

The image cropping manager 210, or aspects or components associated therewith, may be implemented as software modules, hardware devices, or using a combination of software, hardware, firmware, fixed logic circuitry, etc. Further, the image cropping manager 210, or components associated therewith, may be implemented as a standalone component of the computing device 202 as illustrated. Additionally or alternatively, the image cropping manager 210 may be configured as components of web services, applications, an operating system of the computing device 202, plug-in modules, or other device applications.

Although image cropping manager 210 is generally described herein as providing image crop suggestions, in some implementations, an image may be automatically cropped to account for ROI positioning and/or ROI preservation via adaptive margins. In such implementations, the image may be automatically cropped in accordance with maximizing ROI positioning and/or ROI preservation via adaptive margins and, thereafter, provided to the user via a user device or stored.

Figure 3:
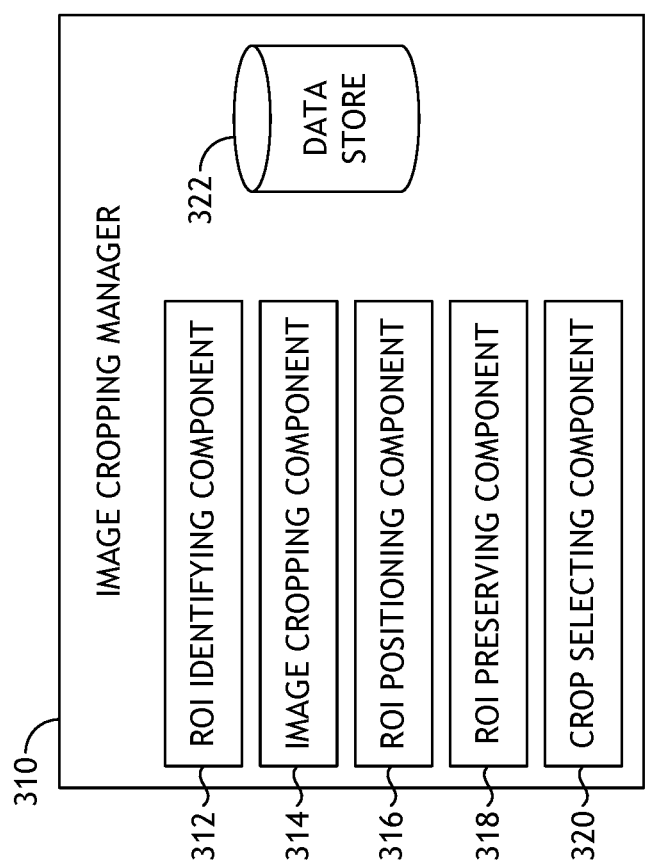
FIG. 3 provides an exemplary image cropping manager in accordance with embodiments of the present invention.

Turning now to FIG. 3, FIG. 3 provides an exemplary image cropping manager 310 in accordance with embodiments of the present invention. The image cropping manager 310 is illustrated with a ROI identifying component 312, an image cropping component 314, a ROI positioning component 316, a ROI preserving component 318, a crop selecting component 320, and a data store 322. These components represent functionality of the image cropping manager and it should be appreciated that such functionality may be implemented using more or fewer components than those illustrated.

The image cropping manager 310, and/or components associated therewith, can access data store 322. Data store 322 can store any type of data used in association with automated image cropping. By way of example only, data store 322 may include images, candidate cropped images, image sizes, image dimensions, indications of regions of interest, indications of aggregate regions, ROI positioning scores, ROI preservation scores, other crop-related scores (e.g., aesthetic scores), and/or the like. Such data may be provided to or referenced by the image cropping manager 310, or components thereof. Further, the image cropping manager 310, or components thereof, may provide such data to the data store 322 for subsequent use.

At a high level, the image cropping manager 310 is configured to facilitate enhanced automated image cropping that incorporates ROI positioning and/or ROI preservation. Generally, the ROI identifying component 312 is configured to identify regions of interest within images, and the image cropping component 314 generates various candidate image crops associated with images. The identified regions of interest are then used by the ROI positioning component 316 and the ROI preserving component 318 to analyze the candidate image crops in accordance with enhanced ROI preservation. In particular, the ROI positioning component 316 can analyze the positioning of regions of interest within candidate image crops to facilitate preservation of ROI positioning relative to the original image. The ROI preserving component 318 can facilitate preservation of regions of interest using adaptive margins in association with automated image cropping. The crop selecting component 320 can then employ the ROI positioning and/or ROI preserving analysis to select a set of candidate image crops to provide as image cropping suggestions and/or to crop images, as described in more detail below.

The ROI identifying component 312 is configured to identify regions of interest in images. As previously discussed, a region of interest (ROI) can be any area or portion of an image that is deemed interesting or important such that it is intended to be preserved in a cropped image. For example, a region of interest may be an individual, a face region, or another object. A region of interest may be defined in any number of ways and is not intended to be limited in scope herein. For instance, regions of interest may be predefined objects, objects of a specific size, objects of a specific color, etc.

Regions of interest can be identified in any number of ways and such identification is not intended to limit the scope of embodiments of the present invention. In one embodiment, a region of interest can be designated based on a user selection of an object or region (e.g., as designated by a center point, area, outline, freeform selection, etc.). In another embodiment, a region of interest may be automatically detected. For instance, various facial recognition technologies can be employed to detect face regions within images. Other object detection technologies can additionally or alternatively be employed to detect regions of interest within images.

A region of interest can be represented or designated as an area or region of any shape and/or size. For example, in some embodiments, the region of interest may outline the shape of the object, such as a face. In other embodiments, the region of interest may be a predetermined shape, such as a rectangle, that encompasses the region of interest. By way of example only, a region of interest may be defined by a rectangle that encompasses the entirety of an interesting or desired object (e.g., face).

In accordance with embodiments described herein, in addition to identifying regions of interest within images, the ROI identifying component 312 can also identify aggregate regions within images. An aggregate region refers to a region or area in an image that incorporates or includes one or more regions of interest. In some cases, the aggregate region includes each of the regions of interest in the image. An aggregate region may be determined or computed to be a smallest, rectangular region (or other shaped region) that covers or surrounds all the regions of interest.

Figure 4:
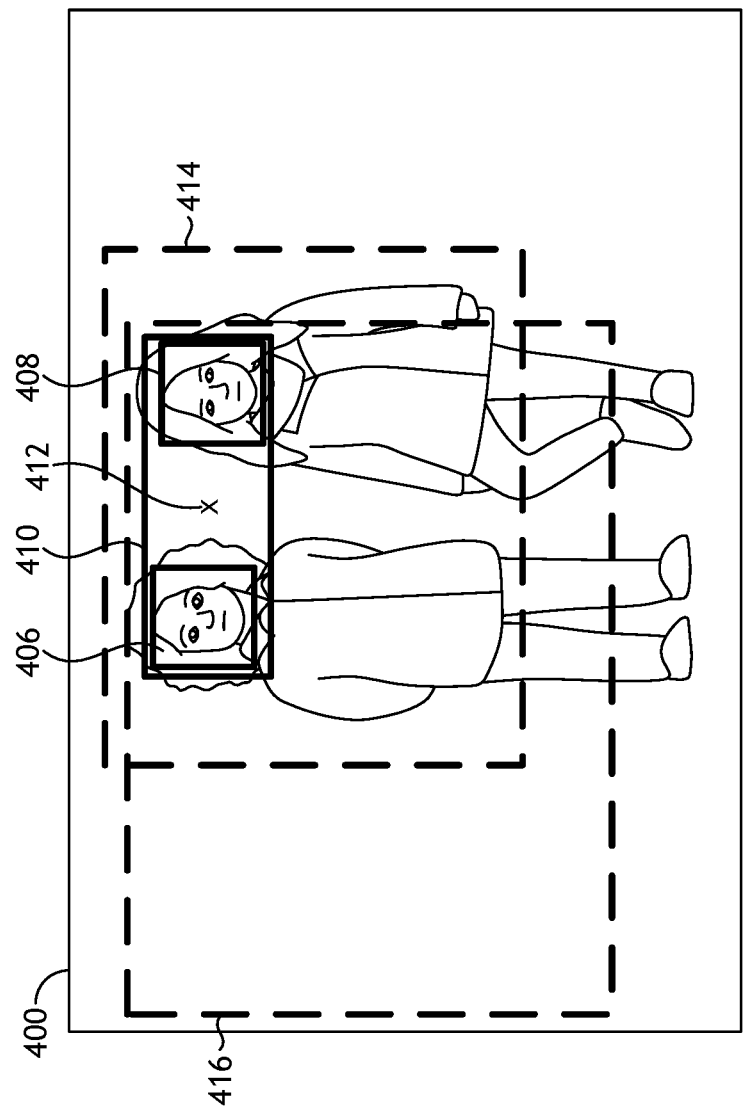
FIG. 4 illustrates an example of ROI positioning preservation, in accordance with embodiments of the present disclosure.

By way of example, and with reference to FIG. 4, assume face 402 and face 404 are automatically detected or selected by a user. In such a case, the ROI identifying component may identify ROI 406 to encompass face 402 and ROI 408 to encompass face 404. In this example, ROI 406 and ROI 408 are rectangular in shape, but may generally be any shape. Using the ROIs 406 and 408, the ROI identifying component can identify aggregate region 410 that encompasses each of the identified ROIs 406 and 408.

The image cropping component 314 is configured to generate multiple candidate image crops to be analyzed. A candidate image crop refers to a potential image crop for an image, for instance, that may be selected for presentation to a user. Accordingly, multiple candidate image crops derived from an image may be considered candidate image crops as some of those candidate image crops may eventually be selected to present to a user while others are not. Generally, and as described in more detail below, the candidate image crops are ranked based on various factors or scores, and such image crop rankings are used to select a set of the candidate image crops for providing as a suggestion to a user and/or for application to the image.

For a particular image, the image cropping component 314 may derive multiple candidate image crops at different sizes and aspect ratios. For example, the image cropping component 314 may derive candidate image crops for commonly used photograph sizes, such as image crops for 3×5 inches, 4×6 inches, 5×7 inches, and the like. The image cropping component 314 may also derive candidate image crops for commonly used aspect ratios, such as 4:3, 16:9, 1:1, and the like. In addition or in the alternative to deriving multiple different sized candidate image crops, the image cropping component 314 may derive multiple different candidate image crops that each have a same size, e.g., each of the candidate image crops may have a size of 3×5 inches. It is to be appreciated that the image cropping component 314 may derive candidate image crops at sizes and aspect ratios other than those enumerated above without departing from the scope of the techniques described herein. The image cropping component 314 may also derive candidate image crops for a variety of shapes, including rectangles (e.g., at the sizes and aspect ratios mentioned above), circles, triangles, ovals, and other different shapes.

Further, the image cropping component 314 may derive candidate image crops according to user selections. Through a user interface, for instance, a user may select to have multiple image crops derived at different sizes. A user may also select through the user interface to have multiple image crops derived at a same size. Alternatively, or in addition, the user interface may enable a user to specify a shape (square, circle, rectangle, user drawn, etc.) according to which an image is cropped. In some implementations, the image cropping component 314 may derive the multiple candidate image crops without user input to specify how a user would like an image cropped. For example, the image cropping component 314 may derive multiple different sized crops (or multiple crops of a same size) of an image automatically, such as according to default settings.

The ROI positioning component 316 is configured to facilitate preservation of region of interest positioning. In particular, the ROI positioning component 316 facilitates identification and/or selection of a candidate image crop(s) that preserves or maintains the original position of the region(s) of interest within the image (original image composition). In this regard, the ROI positioning component 316 generally preserves the initial composition a photographer has included when capturing the image. For example, a face region may be captured on the left side of the image because the individual is looking towards an object on the right side of the image. As such, the ROI positioning component 316 facilitates preservation of a similar relative position of the face region in an image crop as captured in the original image. That is, the ROI positioning component 316 seeks to preserve the face region being located on the left side of the image crop to increase the likelihood of capturing the context originally intended by the image capture, in this case, the object positioned on the right side of the image. By preserving the position of the face in an image crop, the image crop is more likely to include the object at which the individual is looking, as opposed to the object being excluded from the cropped image.

To identify candidate image crops that preserve ROI positioning, the ROI positioning component 316 analyzes region(s) of interest positions in association with candidate image crops. In embodiments, aggregate regions that encompass regions of interest can be used to facilitate preservation of ROI positioning. Although aggregate regions are generally described herein for use in preserving ROI positions, other embodiments that analyze the specific ROIs in the image can be employed.

In one embodiment, to identify an extent to which a candidate image crop preserves ROI positioning, positions of the aggregate region relative to the original image and the candidate image crop can be compared to one another. To this end, a relative position of the aggregate region with regard to an original image can be compared to a relative position of the aggregate region with regard to a candidate image crop. That is, a difference or displacement of relative positions of an aggregate region can be used to identify candidate image crops that preserve ROI positioning. The closer the relative positions are to one another, the more likely the ROI positioning is preserved. Accordingly, a comparison of a first candidate image crop resulting in a similar relative ROI position as an original image to a second candidate image crop resulting in a varied relative ROI position as the original image, can result in identification of the first candidate image crop to preserve ROI positioning. Generally, the likelihood of preserving ROI positioning is greater when relative position is maintained. A position relative to the original image can also be referred to herein as an image relative position, and a position of the aggregate region relative to the candidate image crop can be referred to herein as a crop relative position.

Relative positions of aggregate regions (e.g., image relative position or crop relative position), or ROIs, can be determined in any number of ways. In accordance with embodiments described herein, a relative position of the aggregate region with respect to the crop and a relative position of the aggregate region with respect to the original image are both determined. Relative positions may be identified and denoted in various manners, and the embodiments described herein are not intended to limit the scope of embodiments of the present invention.

To determine relative positions, a position of the aggregate region is determined. A position of the aggregate region can be designated in any number of ways. In some implementations, a center point of the aggregate region may be used to determine relative position of the aggregate region. Although a center point of the aggregate region is generally used herein to designate a position of the aggregate region, any other point can be used, for example, a lower, left-side corner of the aggregate region. The position, such as center point, of the aggregate region can then be used to determine a crop relative position and an image relative position.

To determine a relative position(s), such as crop relative position and image relative position, a measure or distance between a position of the aggregate region (e.g., center point) and a reference point (e.g., reference point associated with the original image or cropped image) can be determined. A reference point associated with the original image or the cropped image can be any point. By way of example only, a position of the cropped image or original image may be indicated by a center point or a lower, left-side (e.g., origin coordinate), etc. A reference point associated with an original image may be referred to herein as an image reference point, and a reference point associated with a candidate image crop may be referred to herein as a crop reference point.

Using a position of the aggregate region and a reference point of the original image, a position of the aggregate region relative to the original image can be determined. Similarly, using a position of the aggregate region and a reference point of the cropped image, a position of the aggregate region relative to the image crop can be determined. Relative positions may be indicated in any number of ways. For example, in some cases, a relative position may be represented by the difference in pixels (e.g., x-coordinate and y-coordinate) between the position of the aggregate region and corresponding reference point (e.g., associated with the original image or the image crop).

In one embodiment, the relative positions can be represented using normalized coordinates (e.g., pixel displacement divided by the width/height in pixel). For instance, image relative positions can be normalized by the width and height of the original image such that the relative position x-coordinate and y-coordinate has a value between 0 and 1. Similarly, crop relative positions can be normalized by the width and height of the candidate image crop such that the relative position x-coordinate and y-coordinate has a value between 0 and 1. By way of example only, assume a relative position is initially represented as 400 pixels by 300 pixels. Further assume that an image, such as an original image, is 800 pixels in width and 600 pixels in height. Instead of a relative position of (400, 300), the relative position can be normalized and represented as (0.5, 0.5) indicating the center of the aggregate region, or ROI, is in the center of the image.

Upon determining the relative positions, such positions can be compared to one another. In this regard, the distance between relative positions can be determined. If the aggregate region has a relative position in the candidate image crop similar to a relative position in the original image, that is, their relative positions are similar or a small distance, the more likely the ROI position is preserved in the candidate image crop. On the other hand, if the aggregate region has a relative position in the candidate image crop dissimilar to a relative position in the original image, that is, their relative positions are dissimilar or a large distance, the less likely the ROI position is preserved in the candidate image crop.

To identify or select a set of one or more candidate image crops that preserve ROI position, in some embodiments, a ROI positioning score can be used to facilitate selection of candidate image crops that preserve ROI positioning in relation to the original image. A ROI positioning score can provide an indication of an extent to which ROI positioning is preserved. In such cases, ROI positioning scores can be determined for candidate image crops. The ROI positioning scores associated with the candidate image crops can be compared to one another and used to select candidate image crops that preserve ROI position.

In some implementations, a ROI positioning score is generated using relative positions. For instance, distance between relative positions can be used to generate ROI positioning scores in association with candidate image crops. As a specific example, assume r denotes an aggregate region that encompasses each of the ROIs in an image. A center position of r (the aggregate region) relative to the original image is denoted as $(x_r, y_r)$, where $x_r, y_r \in (0,1)$ are normalized coordinates. Given a candidate image crop c, the center position of r (the aggregate region) relative to the candidate image crop is denoted $(x_r^c, y_r^c)$, where $x_r^c, y_r^c \in (0,1)$ are normalized coordinates. In this example, the ROI positioning score is computed as:

$$S_p = -\exp\left(\frac{\sqrt{(x_r - x_r^c)^2 + (y_r - r_r^c)^2}}{\sigma_p^2}\right) \quad \text{(Equation 1)}$$

When the relative position of the aggregate region in association with the candidate image crop is similar to the relative position of the aggregate region in association with the original image, the ROI positioning score $S_p$ will be greater. In this regard, when the distance between relative positions is small, the particular candidate image crop has a similar ROI positioning composition as the original image and results in a higher ROI positioning score.

The ROI positioning scores can be used to identify and/or select candidate image crops that preserve ROI positioning. In some embodiments, the ROI positioning component 316 may provide the ROI positioning score to another component, such as the crop selecting component 320, to identify and/or select candidate image crops. In this way, the crop selecting component 320 can use ROI positioning scores, in some cases, along with other scores, to select a set of candidate image crops for providing to a user. In other embodiments, the ROI positioning component 316 may use the ROI positioning scores to identify and/or select candidate image crops to provide a user. By way of example only, the ROI positioning component may select a set of candidate image crops associated with a greatest ROI positioning score(s) or a set of candidate image crops associated with ROI positioning score(s) that exceed a positioning score threshold.

An example of ROI positioning preservation is illustrated in FIG. 4. As shown in FIG. 4, the aggregate region 410 encompasses region of interest 406 and region of interest 408. In this case, the aggregate region 410 is the smallest rectangle that covers all of the ROIs in the image 400 and has a center position 412. Assume candidate image crop 412 and candidate image crop 414 are identified. The center position 412 relative to the original image 400 can be determined to identify the image relative position. Similarly, the center position 412 relative to candidate image crop 414 can be determined to identify a first candidate relative position. The ROI positioning score associated with the candidate image crop 414 can then be determined based on the difference between the image relative position and the first candidate relative position. To determine a ROI positioning score associated with the candidate image crop 416, the center position 412 relative to candidate image crop 416 can be determined to identify a second candidate relative position. The ROI positioning score associated with the candidate image crop 416 can then be determined based on the difference between the image relative position and the second candidate relative position. In this example, because the first relative position associated with candidate image crop 414 is nearer to the image relative position than the second relative position associated with the candidate image crop 416, the ROI positioning score associated with the candidate image crop 414 will be greater and, as such, favored.

Figure 5A:
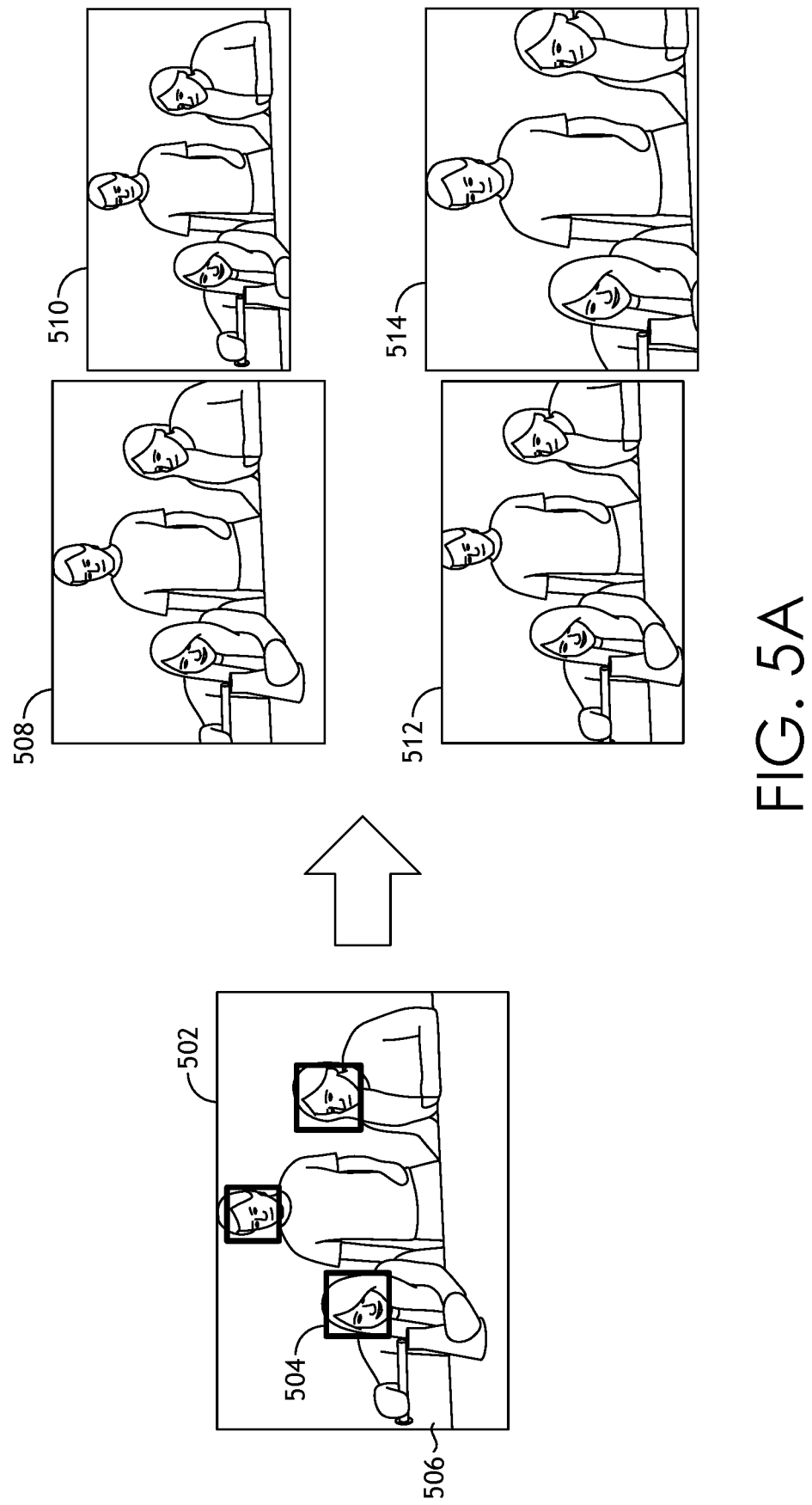
Figure 5B:
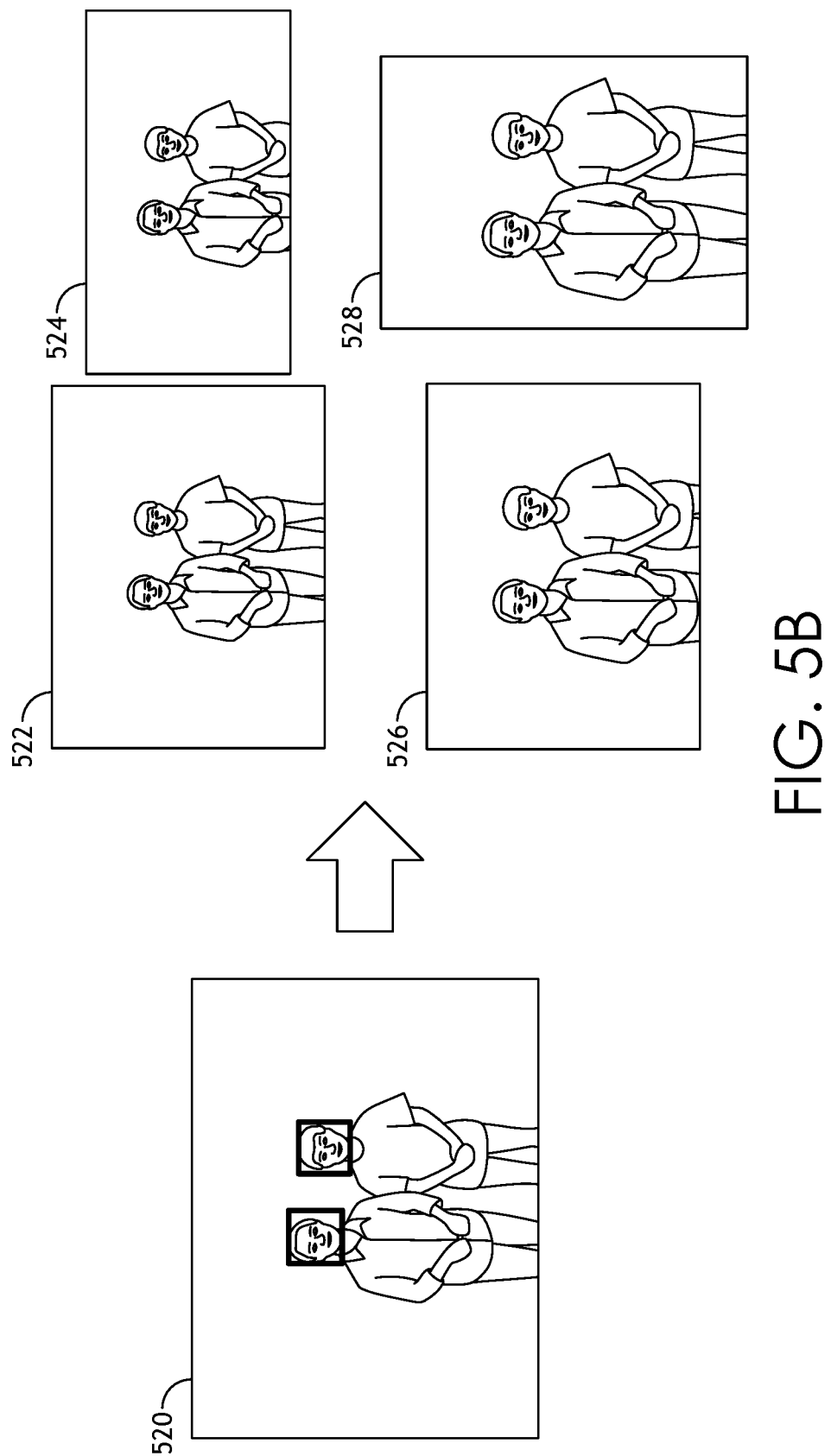

FIGS. 5A-5C illustrate image crop suggestions selected and provided to a user in accordance with ROI positioning preservation. In FIG. 5A, the original image 502 includes a focus on individual 504 performing an experiment. Accordingly, a well-composed image crop would include space under the individual 504 to expose relevant content within the image, in this case, the experiment object 506. As shown, each of the image crop suggestions 508, 510, 512, and 514 incorporate both the individual 504 and the experiment object 506. In FIG. 5B, the original image 520 includes a portrait of two individuals, where the focus is on the individuals rather than the background scene. Accordingly, a well-composed image crop would maintain the individuals generally centered in the image crop suggestions. As shown, each of the image crop suggestions 522, 524, 526, and 528 include the individuals generally centered. In FIG. 5C, the original image 530 includes an individual looking to the right. As such, a well-composed image crop might maintain the individual's position on the left side of the image crop thereby leaving more space in the gaze direction of the individual. As shown, each of the image crop suggestions 532, 534, 536, and 538 maintain the original position of the individual (i.e., include the individual on the left size of the image).

Returning to FIG. 3, the ROI preserving component 318 is configured to facilitate ROI preservation using adaptive margins. In particular, the ROI preserving component 318 encourages identification and/or selection of candidate image crops that completely or entirely include or encompass a region of interest(s) based on adaptive margins. As previously described, because a region of interest abutting or colliding with a border of an image crop is not ideal, margins associated with candidate image crops can be generated and used to assess whether the ROIs fall within a valid region. In other words, a valid region within a candidate image crop is used to identify whether the ROIs within the image are appropriately preserved for a candidate image crop. When the ROIs fall within the valid region, the regions of interest are generally deemed preserved in the candidate image crop. When a ROI falls outside of the valid region, the regions of interest can be deemed as not preserved in the candidate image crop.

Margins associated with a candidate image crop can be defined in a number of manners. In some embodiments, a fixed margin approach can be used to determine the margins. For example, a fixed margin may be a margin that is fixed in size or scale (e.g., $\frac{1}{12}$ the size of the cropped image). Utilizing a margin scaled in relation to the crop size can provide a more quality candidate image crop selection compared to a fixed-size margin such that larger candidate image crops can have proportionally larger margins to maintain relative composition constraints.

In other embodiments, an adaptive margin implementation is used to determine the margins for candidate image crops. An adaptive margin adapts to or accounts for positions of the region(s) of interest within the original image. Advantageously, using an adaptive margin approach can enable larger candidate image crops, which may include important image content, to preserve regions of interest even when positioned near a boundary of the original image and, as such, promote such candidate image crops for selection as an image crop suggestion.

In accordance with embodiments described herein, to facilitate preservation of ROIs using adaptive margins, the ROI preserving component 318 identifies appropriate margins for candidate image crops. The adaptive margin approach can adjust the margins in association with a candidate image crop, and thereby adjust the valid regions, using a fixed-scale margin or a distance between the aggregate region and the original image boundary, whichever is more appropriate. This adaptive margin approach typically adjusts the valid region of larger candidate image crops so that ROIs near the image boundary can be considered covered when assessing ROI preservation. Accordingly, such margins can then be used to facilitate identification and/or selection of candidate image crops that preserve ROIs.

With adaptive margin implementation, the ROI preserving component 318 selects a margin for each boundary of a candidate image crop that is no larger than the distance from the boundary of the aggregate region to the corresponding boundary of the original image. In effect, a larger candidate image crop can preserve a ROI even when the ROI is near an image boundary. On the other hand, the fixed-scale approach may result in the larger candidate image crop not preserving ROIs. For instance, in cases that an aggregate region is near an image boundary, the margin associated with a large candidate image crop would typically be fairly large making the region(s) of interest not within the valid region and thereby unsatisfactory. By constraining the margin to be no larger than the distance from the aggregate region to the original image border, a smaller margin can result thereby enabling the aggregate region to fit within the valid region.

To ensure a margin is equal to or smaller than a distance between a boundary of an aggregate region and corresponding original image boundary, the distance (also referred to herein as a boundary distance) can be determined. As such, the ROI preserving component 318 can determine the boundary distances indicating distance from the boundaries of the aggregate region to the boundary of the original image. As can be recognized, the boundary distances can be identified independent of a particular crop candidate. Such boundary distances can be represented in any number of ways (e.g., pixels, normalized, etc.).

For each candidate image crop, the ROI preserving component 318 can select a margin for each boundary that is no larger than the corresponding boundary distance between the aggregate region and the original image. In embodiments, the margin can be constrained to a set of candidate margins, one of which includes the boundary distance between the aggregate region and the original image. Utilizing a boundary distance as a constraint ensures that the margin is no larger than the distance between the aggregate region and the original image.

In one implementation, a margin for a boundary of a candidate image crop can be selected from a boundary distance and a fixed-proportional margin for the boundary. In such an implementation, the smaller or minimum of the two margin candidates can be selected as the margin for the boundary. As such, in instances when the fixed-proportional margin for a boundary is greater than a boundary distance, the boundary distance is selected for the margin for use in determining ROI preservation. Although embodiments described herein generally select a margin from a fixed-scale margin and a boundary distance, as can be appreciated, alternative approaches can be used. For example, a margin may be selected from a fixed-size margin and a boundary distance. As another example, a margin may be selected from a candidate margin set including a fixed-scale margin, a fixed-size margin, and a boundary distance.

As a specific example to select margins in association with a candidate image crop, assume r denotes an aggregate region that covers all ROIs in an image. The distance between the boundaries of r and the corresponding image boundaries are $d_l$, $d_r$, $d_t$, and $d_b$, corresponding to the left, right, top, and bottom boundaries. The margins for a candidate image crop c are then set as follows:

$$m_k = \begin{cases} \min\{pw_c, d_k\} & k \in \{l, r\}, \\ \min\{ph_c, d_k\} & k \in \{t, b\}, \end{cases} \quad \text{(Equation 2)}$$

where $w_c$ and $h_c$ are the width and the height of the image respectively. This adaptive margin strategy adjusts the valid region of large crops so that ROIs near the image boundary can be included in the valid region.

The selected margins for each boundary of the candidate image crop are then used to define a valid region within the candidate image crop. The valid region can be used to assess whether the region(s) of interest falls within the valid region, that is, whether the region of interest is preserved in the cropped image.

The ROI preserving component 318 can utilize whether the ROIs fall within a valid region to generate a ROI preservation score which indicates an extent to which the ROI is preserved. Utilizing the adaptive margin approach to generate ROI preservation scores enables consideration of the size of the candidate image crop and the position of the ROIs. A ROI preservation score may be determined in any number of ways. For example, using an adaptive margin, a determination can be made as to whether the ROI(s) are completely encompassed in the valid region defined in accordance with the adaptive margin. Continuing with this example, if a valid region of a candidate image crop includes each of the ROIs, a higher ROI preservation score can result. On the other hand, if one or more ROIs are not completely included in the valid region, a lower score may result.

The ROI preserving scores can be used to identify and/or select candidate image crops that preserve ROIs. In some embodiments, the ROI preserving component 318 may provide the ROI preserving score to another component, such as the crop selecting component 320, to identify and/or select candidate image crops. In this way, the crop selecting component 320 can use ROI preserving scores, in some cases, along with other scores, to select a set of candidate image crops for providing to a user. In other embodiments, the ROI preserving component 318 may use the ROI preserving scores to identify and/or select candidate image crops to provide a user. By way of example only, the ROI preserving component may select a set of candidate image crops associated with a greatest ROI preserving score(s) or a set of candidate image crops associated with ROI preserving score(s) that exceed a preserving score threshold.

Figure 6:
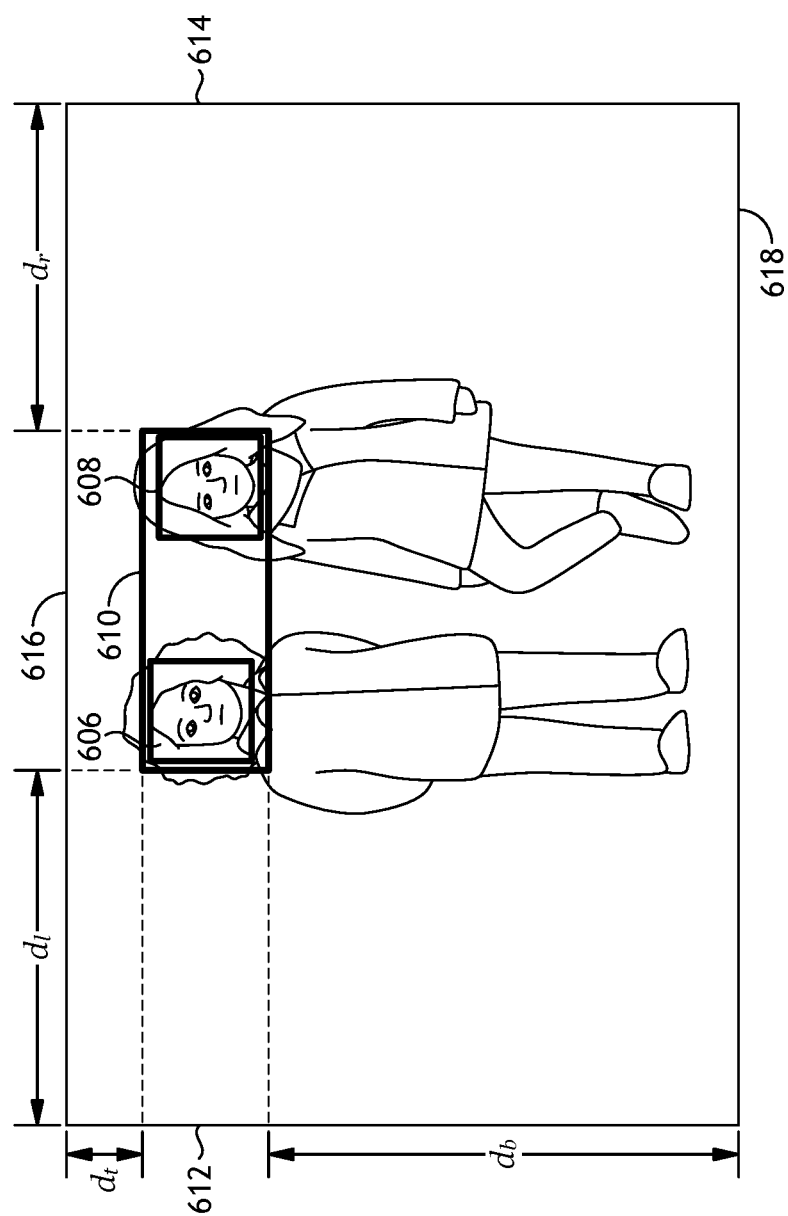
FIG. 6 illustrates an example of ROI preservation in accordance with embodiments of the present invention.

An example of ROI preservation is illustrated in FIG. 6. As shown in FIG. 6, the aggregate region 610 encompasses region of interest 606 and region of interest 608. In this case, the aggregate region 610 is the smallest rectangle that covers all of the ROIs in the image 600. Upon identifying the aggregate region 610, the distances between the aggregate region borders and the corresponding image borders can be determined. In this regard, distance $d_l$ between the aggregate region 610 and the image border 612, distance $d_r$ between the aggregate region 610 and the image border 614, distance $d_t$ between the aggregate region 610 and the image border 616, and distance $d_b$ between the aggregate region 610 and the image border 618 can be determined. Such boundary distances can be used to determine margins via the adaptive margin approach.

Figure 7:
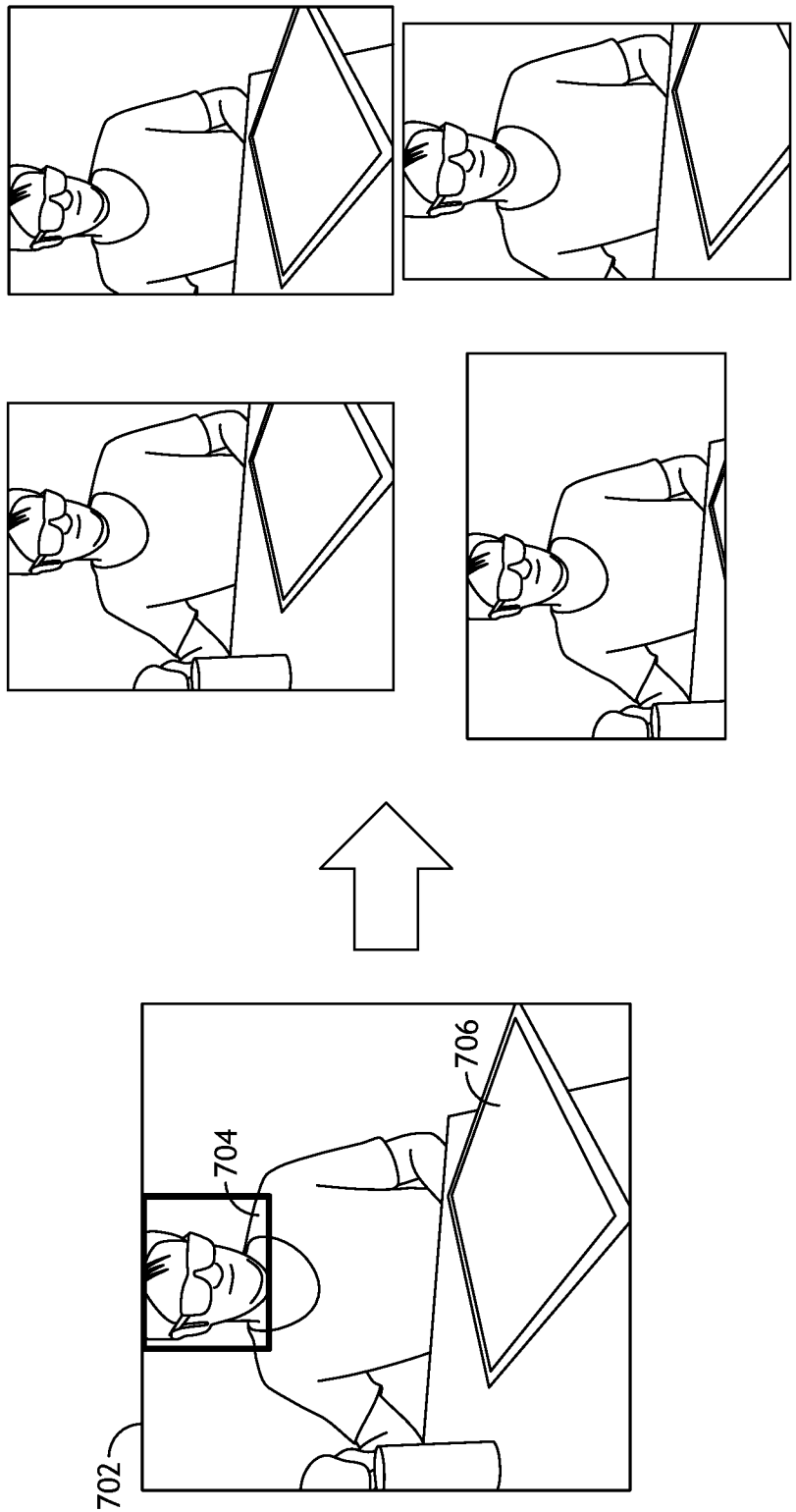
FIG. 7 illustrates an example of image crop suggestions selected in accordance with ROI preservation via adaptive margins.

FIG. 7 provides image crop suggestions selected and provided to a user in accordance with ROI preservation via adaptive margins. In FIG. 7, the original image 702 includes an individual 704 viewing an object 706. Without adaptive margins (not shown), the selected image crop suggestions are generally too tight around the face. With adaptive margins, and as shown in FIG. 7, image crop suggestions can be diversified and enable image crop suggestions to include interesting context of the image.

Returning to FIG. 3, the crop selecting component 320 can utilize the ROI positioning and/or ROI preserving features to facilitate automated image cropping. In this regard, crop selecting component 320 can use component ROI positioning score and/or ROI preserving score to select a set of one or more candidate image crops. In some cases, an image crop is automatically performed in accordance with a selected candidate image crop(s). In other cases, the selected candidate image crop(s) is provided as an image crop suggestion(s).

To select candidate image crops, the crop selecting component 320 may score candidate image crops over visual characteristics of cropping. The component ROI positioning score and ROI preserving score may be computed as described above with respect to ROI positioning component 316 and ROI preserving component 318, respectively. The crop selecting component 320 can utilize such scores related to particular cropping candidates to compute a candidate score that indicates a score for a specific candidate image crop. In this way, a candidate score that is generated using a ROI positioning score and/or a ROI preservation score can be determined for a particular candidate image crop. Given multiple croppings of an image, the image cropping manager 310 may employ the crop selecting component to generate candidate scores for a variety of candidate image crops.

As can be appreciated, any number or type of component scores can be used to determine a candidate score for a particular candidate image crop. For example, although embodiments discussed herein generally refer to a ROI positioning score and a ROI preservation score, other scores may additionally or alternatively be used to generate a candidate score. For instance, an aesthetic score that indicates an extent a crop is aesthetically pleasing may be generated and used along with a ROI positioning score and a ROI preservation score to generate an overall candidate score for the candidate image crop. Further, weights can be applied to the various component scores to generate a candidate score. For example, a greater weight may be applied to a ROI preservation score than a weight applied to a ROI positioning score.

Based on the candidate scores, the crop selecting component 320 can rank and/or select one or more candidate image crops. The selected candidate image crop(s) can be provided as an image crop suggestion by presenting such crop suggestions through a user interface. Alternatively or additionally, the selected candidate image crop(s) can be automatically applied to the image to crop the image in accordance with the selected candidate image crop(s).

Exemplary Automated Image Cropping Implementations

Figure 8:
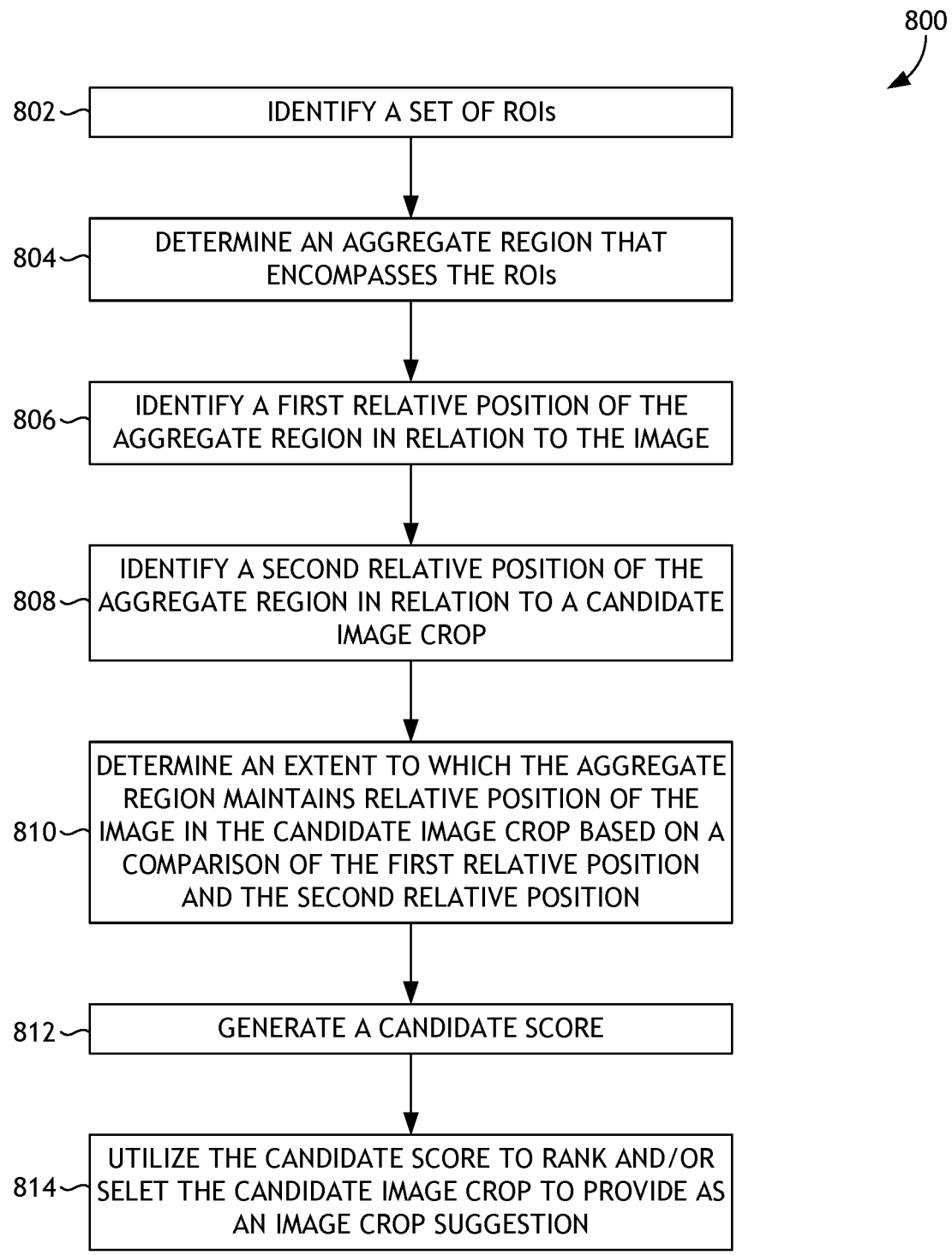
FIG. 8 is a flow diagram showing a method of facilitating automated image cropping in accordance with embodiments of the present disclosure.

Referring now to FIG. 8, a flow diagram is provided showing an embodiment of a method 800 for facilitating automated image cropping. Each block of method 800 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Initially, at block 802, a set of one or more regions of interest are identified. Such regions of interest may be identified based on user input, automated object detection, or the like. At block 804, an aggregate region that encompasses each of the regions of interest is determined. At block 806, a first relative position of an aggregate region in relation to the image is identified. A first relative position may be identified based on a difference between a center point of the aggregate region and a reference point associated with the image. At block 808, a second relative position of the aggregate region in relation to a candidate image crop associated with an image is identified. A second relative position may be identified based on a difference between a center point of the aggregate region and a reference point associated with the candidate image crop. Thereafter, an extent to which the aggregate region maintains a relative position of the image in the candidate image crop is determined based on a comparison of the first relative position and the second relative position, as indicated at block 810. At block 812, a candidate score is generated for the candidate image crop utilizing the extent to which the aggregate region maintains a relative position of the image in the candidate image crop. The candidate score can then be used to rank and/or select the candidate image crop to provide as an image crop suggestion, as indicated at block 814.

Figure 9:
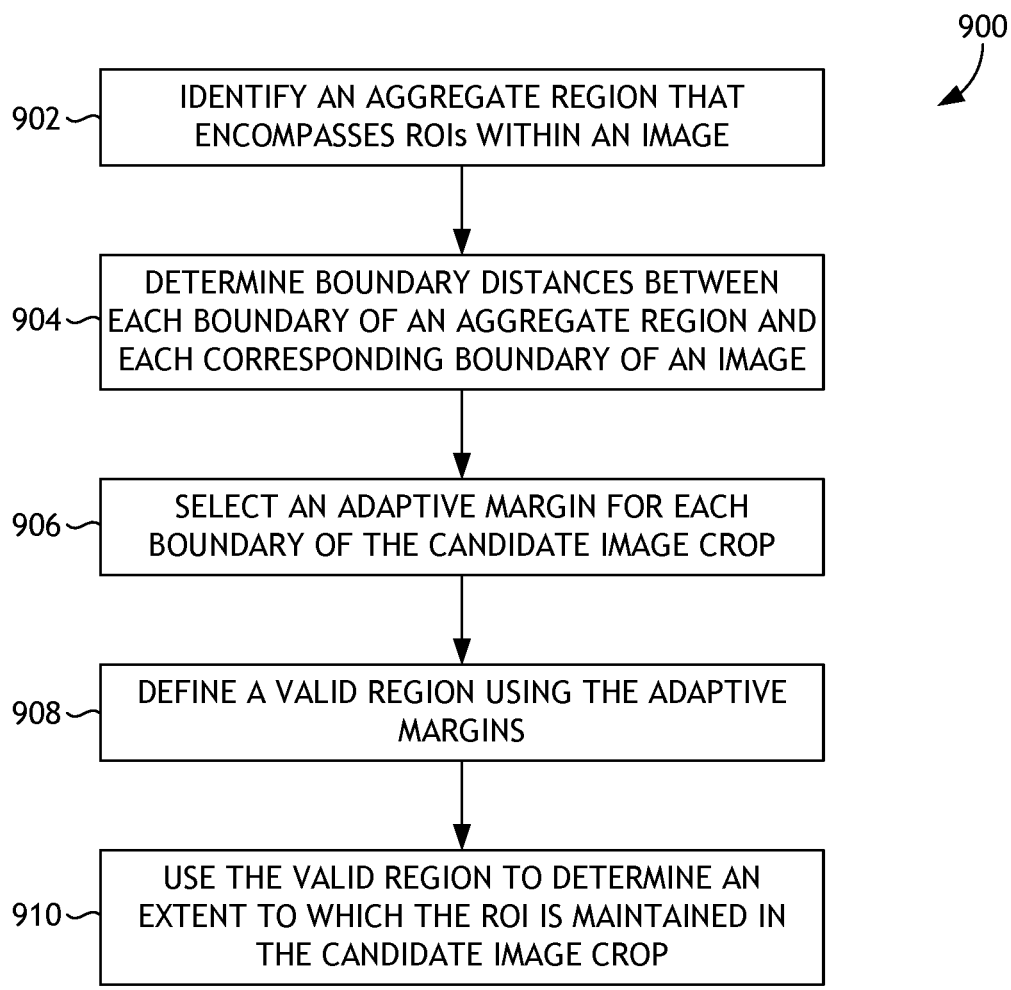
FIG. 9 is a flow diagram showing another method of facilitating automated image cropping in accordance with embodiments of the present disclosure.

Referring now to FIG. 9, a flow diagram is provided showing one embodiment of a method 900 for facilitating automated image cropping. Initially, at block 902, an aggregate region that encompasses a set of regions of interest within an image is identified. At block 904, boundary distances between each boundary of an aggregate region and each corresponding boundary of an image are determined. The boundary distances may be in any number of measures or formats. For each boundary of a candidate image crop, an adaptive margin inward from the corresponding boundary that defines a valid region is selected, as indicated at block 906. In embodiments, the adaptive margin selected for each boundary is a minimum of the boundary distance associated with the boundary and a fixed-scale margin. At block 908, the valid region is defined using the candidate image crop adaptive margins. At block 910, the valid region is used to determine an extent to which the at least one region of interest is maintained in the candidate image crop.

Figure 10:
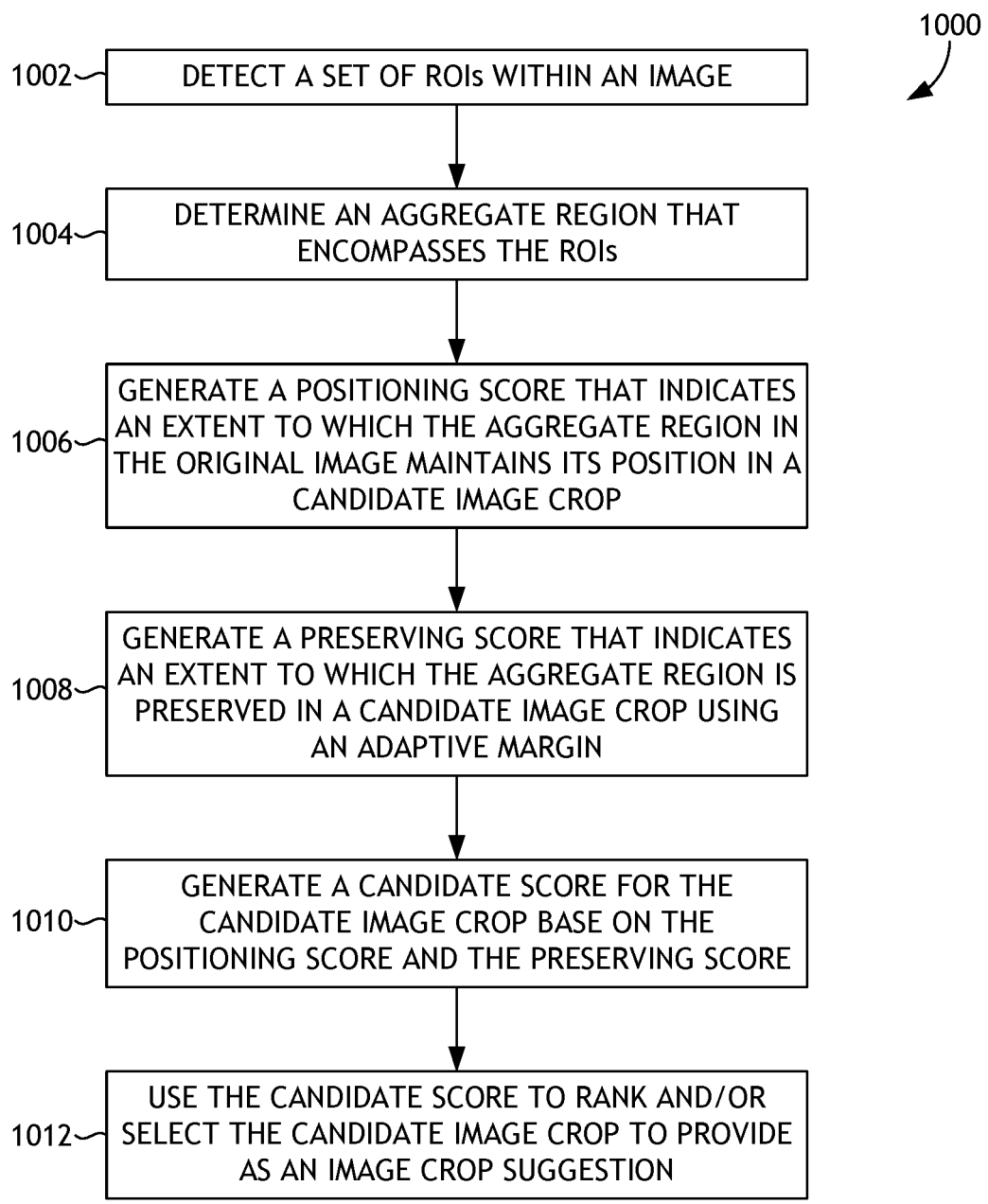
FIG. 10 is a flow diagram showing another method of facilitating automated image cropping in accordance with embodiments of the present disclosure.

Turning now to FIG. 10, a flow diagram is provided showing one embodiment of a method 1000 for facilitating automated image cropping. Initially, at block 1002, a set of one or more regions of interest within an image are detected. For example, regions of interest may be detected based on a user indication or an automated detection. At block 1004, an aggregate region is determined that encompasses the detected regions of interest. In embodiments, the aggregate region is a smallest, rectangular shape that includes each of the ROIs. At block 1006, a positioning score is generated that indicates an extent to which the aggregate region in the original image maintains its position in a candidate image crop. At block 1008, a preserving score is generated that indicates an extent to which the aggregate region is preserved in a candidate image crop using an adaptive margin. At block 1010, a candidate score is generated for the candidate image crop that indicates an overall score of crop quality or composition based at least in part on the positioning score and the preserving score. The candidate score can be used to rank and/or select the candidate image crop to provide as an image crop suggestion, as indicated at block 1012.

Exemplary Operating Environment

Figure 11:
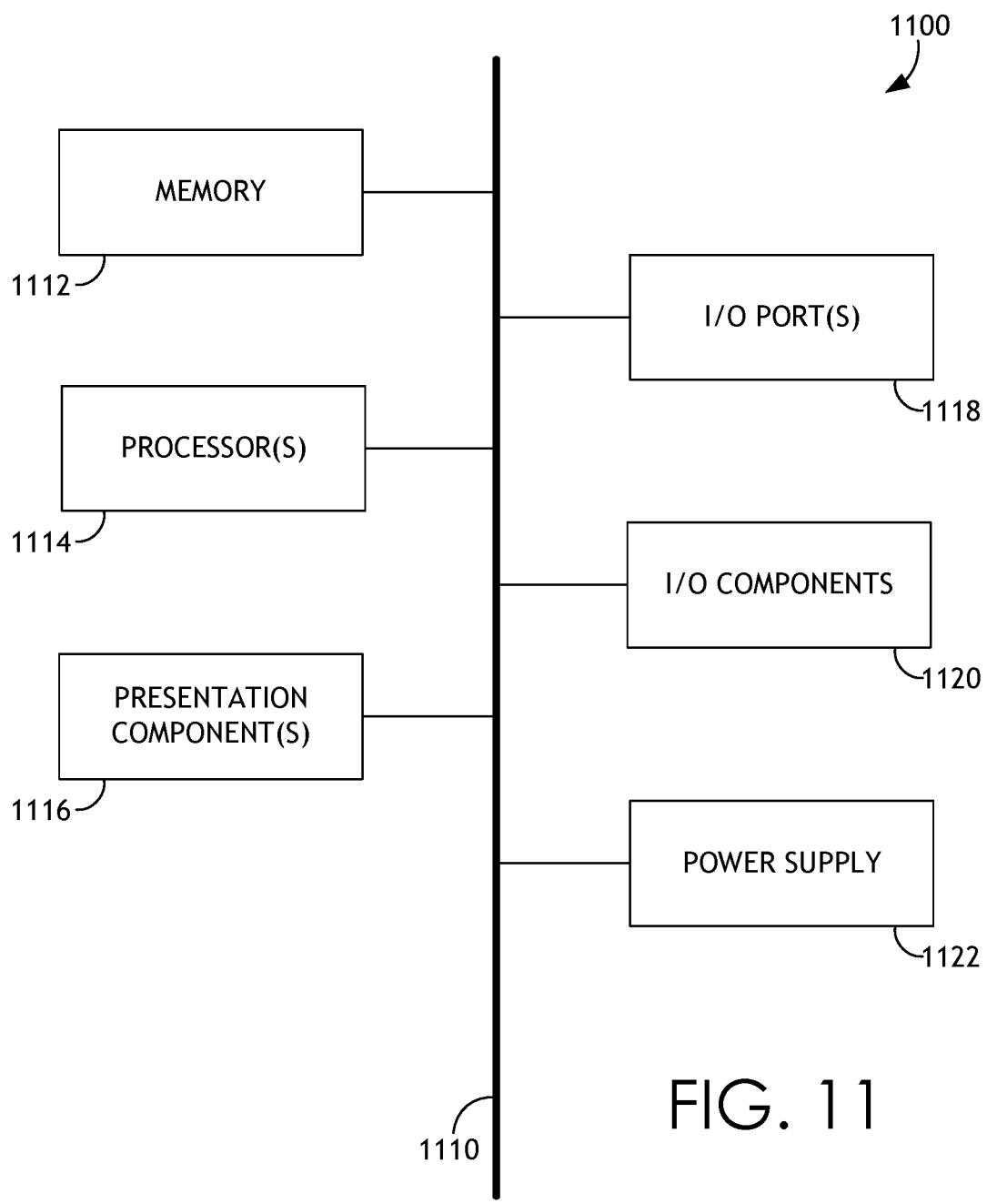
FIG. 11 is a block diagram of an exemplary computing environment suitable for use in implementations of the present disclosure.

Turning now to FIG. 11, FIG. 11 provides a diagram of an exemplary computing environment suitable for use in implementation of the present disclosure. Computing device 1100 includes bus 1110 that directly or indirectly couples the following devices: memory 1112, one or more processors 1114, one or more presentation components 1116, input/output (I/O) ports 1118, input/output components 1120, and illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 11 is merely illustrative of an exemplary computing device that can be used in connection with one or more embodiments of the present invention. Distinction is not made between such categories as "workstation," "server," "laptop," "handheld device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1112 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as stereoscopic camera systems, infrared camera systems, RGB camera systems, and combinations of these, for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

As can be understood, implementations of the present disclosure provide for facilitating optimization of image cropping. The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. A computer-implemented method comprising:
   identifying a first relative position of an aggregate region in relation to the image, the aggregate region including at least one region of interest in the image;
   identifying a second relative position of the aggregate region in relation to a candidate image crop associated with an image;
   determining an extent to which the aggregate region in the image maintains a relative position in the candidate image crop based on a comparison of the first relative position and the second relative position, wherein the first relative position of the aggregate region is determined based on a position of a center point associated with the aggregate region in relation to a first reference point associated with the image and the second relative position of the aggregate region is determined based on the position of the center point associated with the aggregate region in relation to a second reference point associated with the candidate image crop; and
   generating a candidate score for the candidate image crop based on the extent, the candidate score being used to automatically select the candidate image crop and provide the candidate image crop as an image crop suggestion for automated image cropping.

2. The computer-implemented method of claim 1 further comprising:
   identifying the at least one region of interest in the image; and
   using the at least one region of interest to determine the aggregate region.

3. The computer-implemented method of claim 1, wherein the second reference point associated with the candidate image crop comprises a center point of the candidate image crop.

4. The computer-implemented method of claim 1, wherein the aggregate region is a smallest rectangle shape that encompasses the at least one region of interest.

5. The computer-implemented method of claim 1, wherein the comparison of the first relative position and the second relative position further comprises determining a distance between the first relative position and the second relative position.

6. The computer-implemented method of claim 1 further comprising using the candidate score to rank the candidate image crop among other candidate image crops, and selecting a set of candidate image crops for providing as image crop suggestions.

7. The computer-implemented method of claim 1, wherein the extent is further based on whether the at least one region of interest falls within a valid region associated with the aggregate region.

8. The computer-implemented method of claim 7, wherein the valid region comprises a fixed scale margin within the candidate image crop.

9. One or more computer-readable media having a plurality of executable instructions embodied thereon, which, when executed by one or more processors, cause the one or more processors to perform a method comprising:
   determining boundary distances between a set of boundaries of an aggregate region and corresponding boundaries of an image, the aggregate region including at least one region of interest in the image;
   for a boundary of a candidate image crop, selecting an adaptive margin inward from the boundary of the candidate image crop that defines a valid region based on a minimum of a boundary distance of the set of boundaries of the aggregate region associated with the boundary and a fixed-scale margin;

using the valid region to determine an extent to which the at least one region of interest is maintained in the candidate image crop; and based on the extent to which the at least one region of interest is maintained in the candidate image crop, automatically providing the candidate image crop as an image crop suggestion that, when selected, is used to automatically crop the image.

10. The one or more computer-readable media of claim 9 further comprising determining the aggregate region based on the at least one region of interest.

11. The one or more computer-readable media of claim 9, wherein the extent to which the at least one region of interest is maintained in the candidate image crop is based on whether the at least one region of interest falls within the valid region.

12. The one or more computer-readable media of claim 9, further comprising: generating a candidate score for the candidate image crop utilizing the extent to which the at least one region of interest is maintained in the candidate image crop.

13. The one or more computer-readable media of claim 12 further comprising using the candidate score to rank the candidate image crop among other candidate image crops, and selecting a set of candidate image crops for providing as image crop suggestions.

14. The one or more computer-readable media of claim 9, wherein the extent is determined based on relative positions of the aggregate region and the candidate image crop.

15. The one or more computer-readable media of claim 9, wherein the relative positions are determined based a first center point associated with the aggregate region and a second center point associated with the candidate image crop.

16. A computer system comprising:
a processor; and
a computer storage medium storing computer-useable instructions that, when used by the processor, cause the processor to:

identifying a first relative position of an aggregate region in relation to the image, the aggregate region including at least one region of interest in the image;

identifying a second relative position of the aggregate region in relation to a candidate image crop associated with an image;

determining an extent to which the aggregate region in the image maintains a relative position in the candidate image crop based on a comparison of the first relative position and the second relative position, wherein the first relative position of the aggregate region is determined based on a position of a center point associated with the aggregate region in relation to a first reference point associated with the image and the second relative position of the aggregate region is determined based on the position of the center point associated with the aggregate region in relation to a second reference point associated with the candidate image crop; and generating a candidate score for the candidate image crop utilizing the extent, the candidate score being used to automatically select the candidate image crop and provide the candidate image crop as an image crop suggestion for automated image cropping.

17. The computer system of claim 16 further comprising:
identifying the at least one region of interest in the image; and
using the at least one region of interest to determine the aggregate region.

18. The computer system of claim 16, wherein the reference point associated with the candidate image crop comprises a center point of the candidate image crop.

19. The computer system of claim 16, wherein determining the extent further comprises determining a distance between the first relative position and the second relative position.

20. The computer system of claim 16 further comprising using the candidate score to rank the candidate image crop among other candidate image crops, and selecting a set of candidate image crops for providing as image crop suggestions.

* * * * *

UNITED STATES PATENT AND TRADEMARK OFFICE
CERTIFICATE OF CORRECTION

PATENT NO. : 11,663,762 B2
APPLICATION NO. : 17/083899
DATED : May 30, 2023
INVENTOR(S) : Jianming Zhang et al.

Page 1 of 1

It is certified that error appears in the above-identified patent and that said Letters Patent is hereby corrected as shown below:

In the Claims

In Column 21, Line 34 (approx.): In Claim 15, after "based" insert -- on --.

Signed and Sealed this
Twenty-second Day of August, 2023

Katherine Kelly Vidal
*Director of the United States Patent and Trademark Office*